US008074398B2

(12) United States Patent
Hazan

(10) Patent No.: US 8,074,398 B2
(45) Date of Patent: Dec. 13, 2011

(54) GROWING SYSTEM FOR ENHANCED YIELD

(76) Inventor: Haim Hazan, Flushing, NY (US)

( * ) Notice: Subject to any disclaimer, the term of this patent is extended or adjusted under 35 U.S.C. 154(b) by 255 days.

(21) Appl. No.: 12/403,653

(22) Filed: Mar. 13, 2009

(65) Prior Publication Data
US 2009/0277086 A1 Nov. 12, 2009

Related U.S. Application Data

(60) Provisional application No. 61/038,166, filed on Mar. 20, 2008.

(51) Int. Cl.
A47G 7/02 (2006.01)
(52) U.S. Cl. .................................................. 47/83
(58) Field of Classification Search ................ 47/65, 83; 211/131.2
See application file for complete search history.

(56) References Cited

U.S. PATENT DOCUMENTS

| 125,928 | A | * | 4/1872 | Blake | 211/78 |
| 900,820 | A | * | 10/1908 | Becker | 472/46 |
| 1,830,373 | A | * | 11/1931 | Schmidt | 211/164 |
| 1,839,729 | A | * | 1/1932 | Barels | 248/137 |
| 1,968,013 | A | * | 7/1934 | Brownson | 221/34 |
| 1,974,272 | A | * | 9/1934 | Heineman | 211/131.2 |
| 3,784,024 | A | * | 1/1974 | Kristy | 211/131.2 |
| 3,882,634 | A | * | 5/1975 | Dedolph | 47/65 |
| D258,206 | S | * | 2/1981 | Bourke | D11/156 |
| D271,355 | S | * | 11/1983 | Altman | D6/405 |
| 5,248,049 | A | * | 9/1993 | Murphy, Sr. | 211/164 |
| 5,584,141 | A | * | 12/1996 | Johnson | 47/65 |
| 2009/0107037 | A1 | * | 4/2009 | Alinski | 47/1.1 |
| 2009/0277086 | A1 | * | 11/2009 | Hazan | 47/83 |

OTHER PUBLICATIONS

International Search Report of the International Searching Authority mailed May 12, 2009, issued in connection with International Patent App. No. PCT/US2009/037147 (2 pages).
Written Opinion of the International Searching Authority mailed May 12, 2009, issued in connection with International Patent App. No. PCT/US2009/037147 (4 pages).

* cited by examiner

Primary Examiner — Frank T Palo
(74) Attorney, Agent, or Firm — McCarter & English, LLP

(57) ABSTRACT

Disclosed herein is a growing system for enhanced yield. In an exemplary embodiment of the growing system, a plant stand is provided, and a plurality of plant pots can be further provided. The plant stand can include a first frame, a second frame, and a plurality of brackets securing the plant pots to the first frame and the second frame. The plant stand is configured such that the plant pots have a tiered formation. In some embodiments, the brackets each have a segment upon which a corresponding plant pot is seated and segments for securing opposing sides of the plant stand. In some embodiments, the plant stand has a substantially x-shaped elevation.

35 Claims, 8 Drawing Sheets

US 8,074,398 B2

GROWING SYSTEM FOR ENHANCED YIELD

CROSS-REFERENCE TO RELATED APPLICATIONS

The present application claims the benefit of priority to U.S. Application No. 61/038,166, filed Mar. 20, 2008.

FIELD OF THE INVENTION

The present invention relates to a plant stand, a plurality of plant pots, and/or a combination thereof for enhancing crop and/or other plant yield. More specifically, the invention relates to a stand for plant pots that enables an enhanced yield of crops and other plant growth in a given unit of space.

BACKGROUND OF THE INVENTION

Crops and other plants are conventionally grown on top of soil in agriculture, plantation gardens, communal parks, nurseries, green houses, home gardens, etc. For example, in a nursery, crops are grown in the soil, and, in prime time, the seedlings are places on shelves in front of one another. As another example, in controlled agriculture warm habitats, it is not uncommon to utilize a short, round structure with netted poles with crops placed in the middle, and the netted poles allow upward growth of the plants. As yet another example, narrow, long, tall structures are provided with crops planted in the ground soil therebetween, and, for better utilization of the soil, two long shelves are each provided on either side of the crop on said structures.

While such examples have shown some benefit in growing crops and other plants, an efficient utilization of land is not provided. What is needed in the art is a plant pot stand that enables an enhanced yield of crops and other plant growth in a given unit of space.

SUMMARY OF THE INVENTION

Preferred embodiments of the invention overcome the disadvantages and shortcomings of the prior art by providing a growing system for enabling an enhanced yield of crops and/or other plants to grow in a given unit of space, e.g., land. The terms "plant" and "plants" are used herein in its broadest sense to refer to crops, fruits, vegetation, flowers, etc.

Embodiments of the present invention provide a growing system having a plant stand that includes at least one frame and a plurality of brackets. The frame includes at least one inclined frame member and the brackets extend therefrom for seating a plurality of plant pots. The brackets are preferably positioned along the inclined frame member such that, when plant pots are seated upon the brackets, the plant pots are tiered in a manner configured to allow light to reach those plants that might be contained in each one of the plant pots. It is contemplated that the plant stand, including the frame members thereof, for example, can be provided in the form of pipes for allowing irrigation of water therethrough.

In an aspect of the present invention, a frame of the plant stand is provided with a substantially X-shaped elevation. In another aspect of the present invention, a frame is provided having an elevation of another shape, such as a substantially half-X-shaped elevation. It is contemplated that one or more support frame members can be provided to enhance the structural integrity of the plant stand.

Additional features, functions and benefits of the disclosed growing system will be apparent from the detailed description which follows, particularly when read in conjunction with the accompanying figures.

BRIEF DESCRIPTION OF THE DRAWINGS

For a more complete understanding of the present invention, reference is made to the following detailed description of exemplary embodiments considered in conjunction with the accompanying drawings, in which.

DETAILED DESCRIPTION OF THE INVENTION

Figure 1:
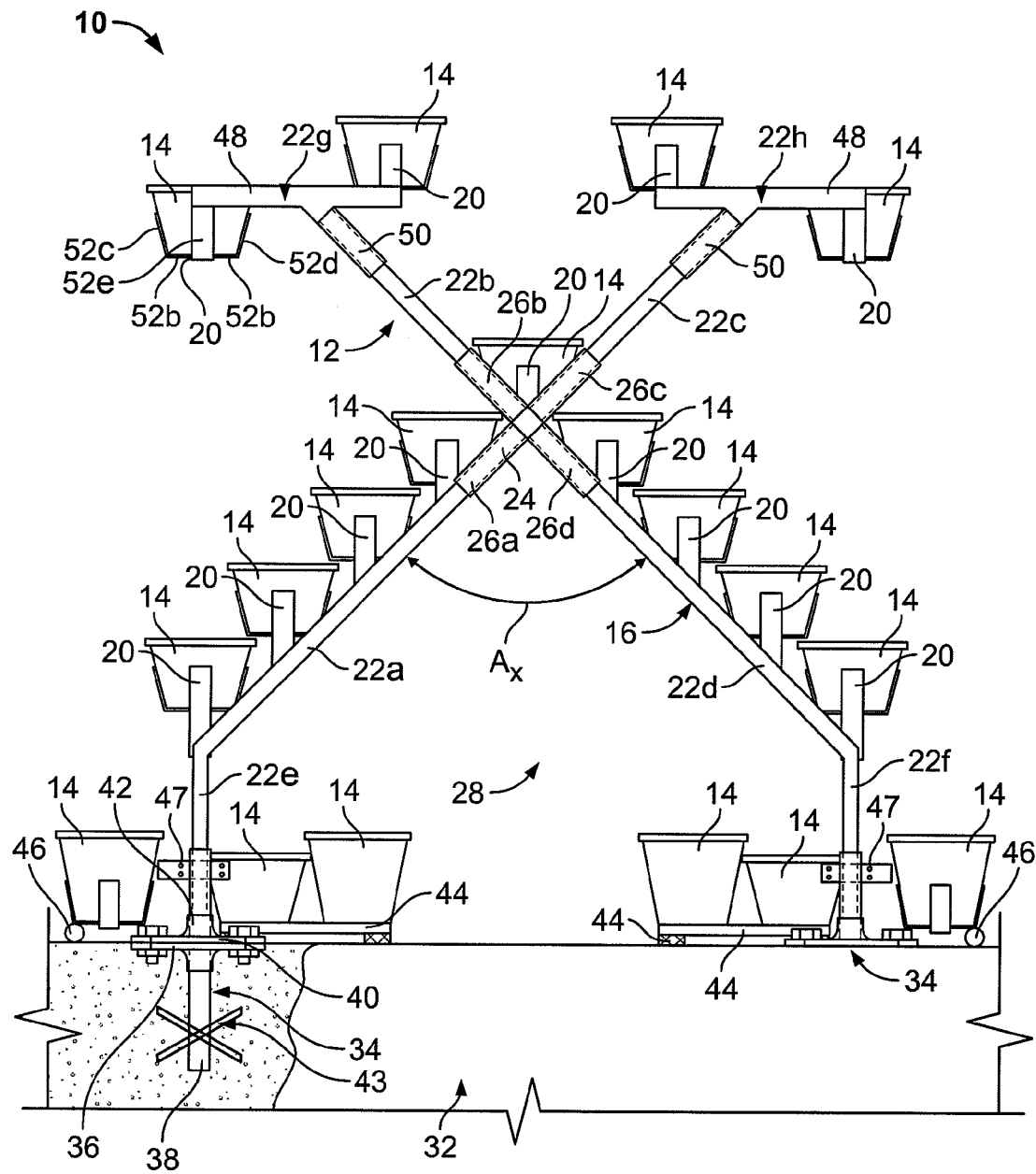
FIG. 1 is an elevational view showing a growing system constructed in accordance with a first exemplary embodiment of the present invention.
Figure 2:
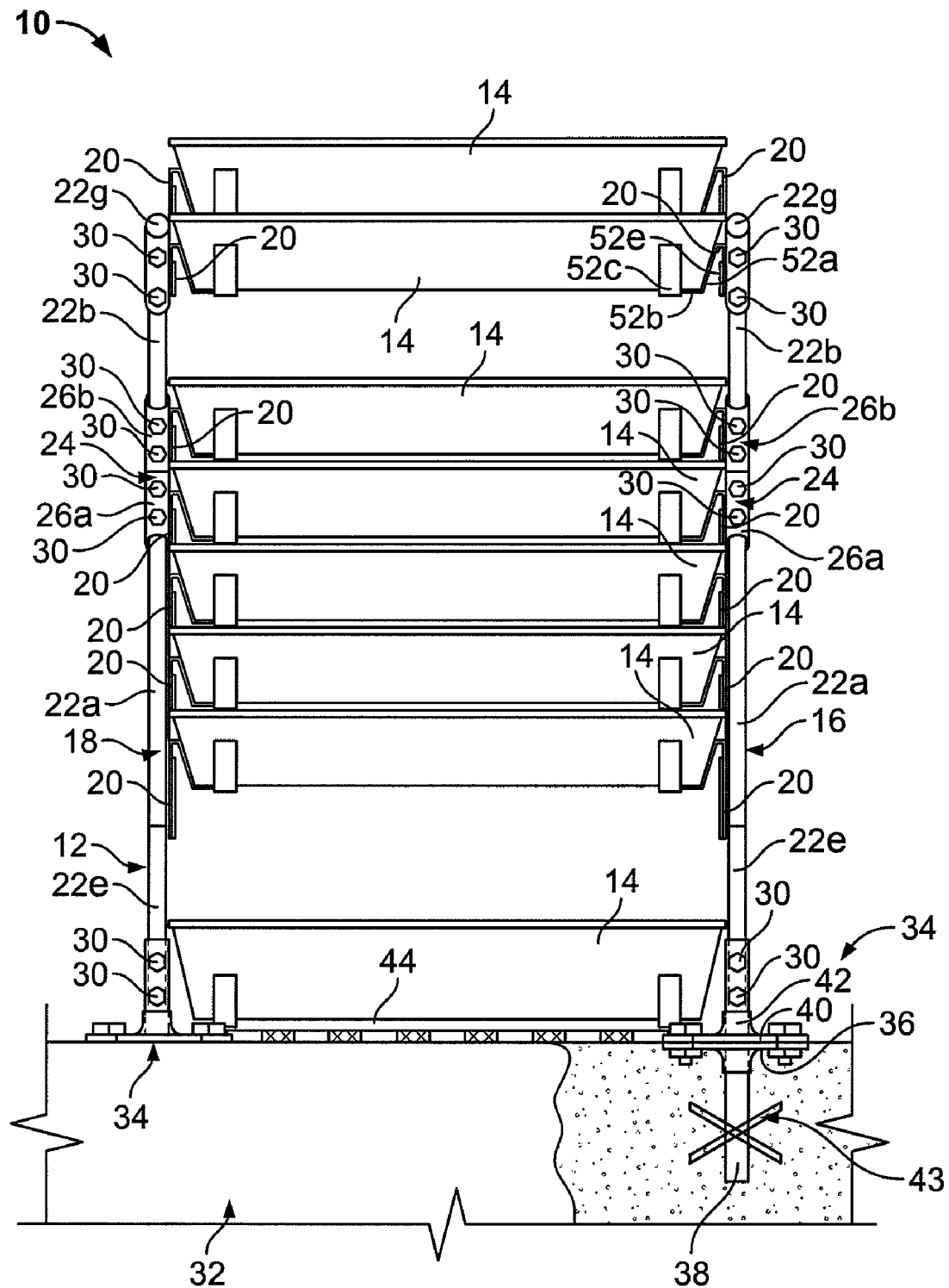
FIG. 2 is front view showing the growing system of FIG. 1.
Figure 3:
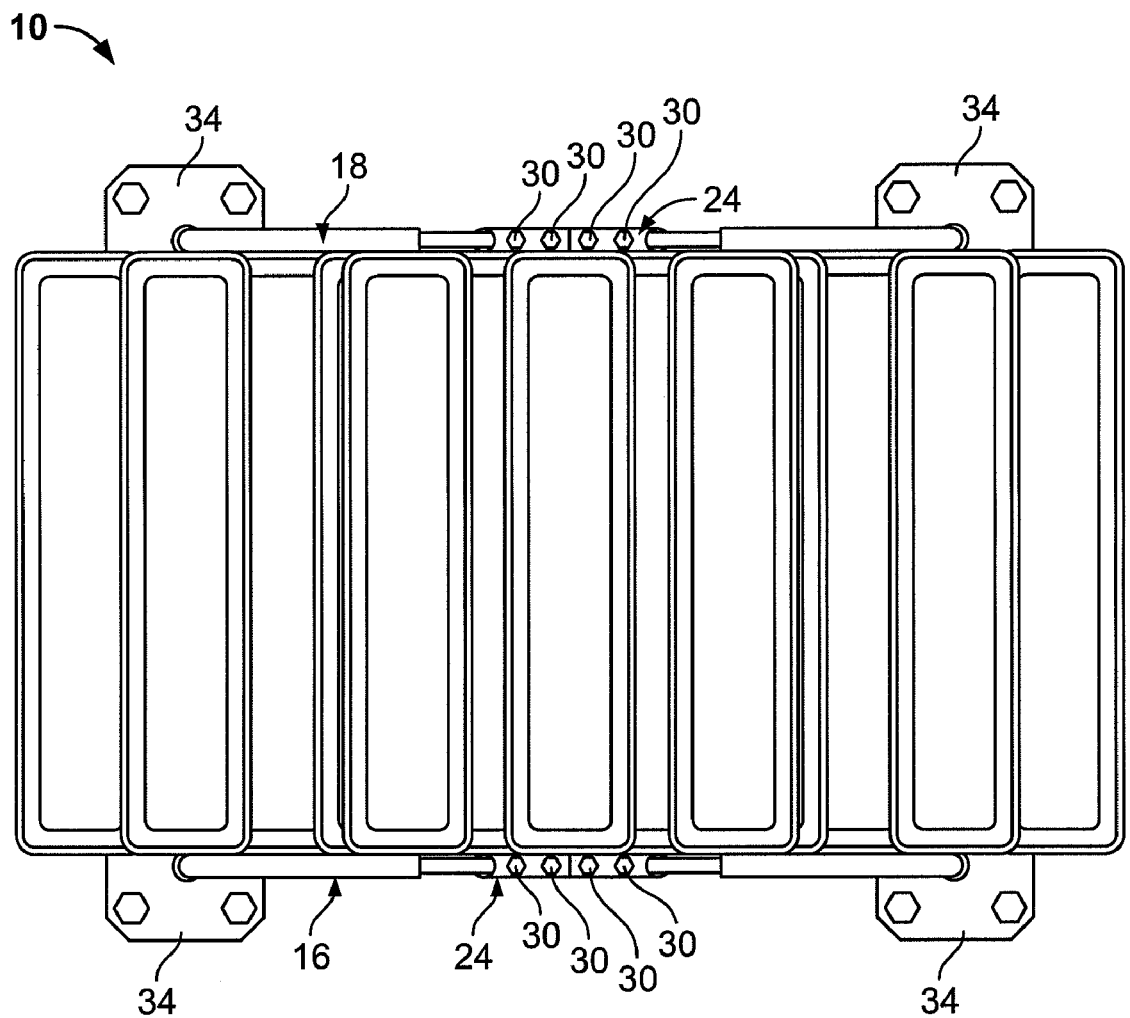
FIG. 3 is a top plan view showing the growing system of FIGS. 1 and 2.

Referring to FIGS. 1-3, a growing system 10 is shown in accordance with a first exemplary embodiment of the present invention. The growing system 10 includes a plant stand 12 and a plurality of plant pots 14 supported thereby. Each one of the plant pots 14 are shown to have an elongated shape with four trapezoidal sides, a rectangular base, and an open top through which sunlight can reach those plants contained within the plant pots 14. It is contemplated that the plant pots 14 can be provided to have any suitable shape, dimensions, etc. known in the art.

Referring to FIG. 2, the plant stand 12 can include a first frame 16 and a second frame 18 spaced apart from the first frame 16, though it is contemplated that the plant stand can be provided with a single frame, two frames, more than two frames, etc. Both the first frame 16 and the second frame 18 are provided with a plurality of brackets 20, which are further described below, and the first frame 16 and the second frame 18 are preferably, though not requisitely, identical to one another in substantially all respects, though the brackets 20 provided with the first frame 16 extend toward the second frame 18 and the brackets 20 provided with the second frame 18 extend toward the first frame 16. Accordingly, discussion is made below with exemplary reference to the first frame 16, and it shall be understood that such discussion of the first frame 16 applies to both the first frame 16 and the second frame 18.

Referring to FIG. 1, the first frame 16 includes a plurality of frame members, which are referenced herein as inclined frame members 22a-d, and which are shown to form a substantially X-shaped elevation. The inclined frame members 22a-d are secured directly and/or indirectly to and/or proximal one another so as to form the X-shaped elevation using any suitable means known in the art. For example, a reinforcing member 24 can be provided with a plurality of female ends 26a-d for each receiving an end of one of the inclined frame members 22a-d. It is also contemplated that braces, for example, can be used to secure an end of each one of the inclined frame members 22a-d to and/or proximal one another. In one aspect of the invention, the plant stand 12 is easily disassembled and/or assembled by a user, and thus the components of the plant stand 12, such as the inclined frame members 22a-d, for example, can be provided as separable, but fastenable, components. A plurality of screws 30 can be provided for securing the inclined frame members 22a-d within the female ends 26a-d of the reinforcing member 24.

As used herein, the terminology "substantially X-shaped elevation" is used to refer to a shape at least forming an angle $A_x$ that is preferably less than one-hundred eighty degrees (180°) and that is more preferably substantially equal to about ninety degrees (90°). The angle $A_x$ is configured to at least partially face or open downwardly, e.g., toward the ground, a floor, etc., when the growing system 10 is in use, and, when in use, an open area, referenced herein as an access area 28, is defined substantially between the inclined frame members 22a, 22d and, in some embodiments, the ground. In some aspects of the invention, the access area 28 can be used as a storage space for tools, etc. It is contemplated that canvas or other material can be hung downwardly from the first and second frames 16, 18 to enclose the access area 28.

The inclined frame members 22a-d and/or other frame members discussed herein can be provided in the form of hollow pipes to allow for irrigation of water therethrough. In this regard, the inclined frame members 22a-d, for example, can have outer surfaces with holes (not shown) formed therein, and structure known in the art, e.g., nozzles, tubing, etc., can be provided to facilitate fluid communication between the inclined frame members 22a-d and those plants that might be contained within the plant pots 14. The inclined frame members 22a-d, when provided as pipes or otherwise, can be formed of a corrosion-resistant metal, and it is contemplated that any suitable means known in the art can be used, such as iron.

It is contemplated that the inclined frame members 22a, 22d can extend, when in use, to the ground soil, for example, for securing the plant stand 12 thereto. However, as shown in FIG. 1, for example, additional supports, referenced herein as support frame members 22e, 22f, can extend from the inclined frame members 22a, 22d, respectively, to facilitate securing the plant stand 12 to the ground, etc. As shown, the support frame members 22e, 22f can be integrally formed with inclined frame members 22a, 22d, respectively, though, as indicated above, the support frame members 22e, 22f can be separate fastenable components to facilitate easy assembly and/or disassembly of the plant stand 12. A distance proximal the base from frame member 22e to frame member 22f can be about forty-eight inches (48"), and an outer distance proximal the base from outer plant pot outer surface to outer plant pot outer surface can be about fifty-five and a half inches (55½"), though the present invention is not limited as such, and any suitable dimensions are contemplated.

The support frame members 22e, 22f can function as posts in that they can be inserted into soil of the ground to stabilize the plant stand 12. However, as shown in FIG. 1, for example, it is contemplated that the growing system 10 can be secured to a hard natural or artificial (man-made) surface, which are collectively referenced herein as a floor 32. As desired, the floor 32 can be formed of rock, pavement, conventional concrete, and/or another desired material. A plurality of bases 34 are provided to secure and/or align the first frame 16 (and the second frame 18) with respect to the ground, such as the floor 32 of a nursery or greenhouse.

For example, in the case of the floor 32 of a nursery that is formed of pavement or conventional concrete, each one of the plurality of bases 34, can include, for example, a first base plate 36 and a substantially cylindrical anchor 38 extending downwardly therefrom, where the first base plate 36 and the cylindrical anchor 38 can be, for example, set in a conventional concrete or pavement floor before the cement, asphalt, etc. has fully hardened. Similarly, each one of the bases 34 can include, for example, a second base plate 40 fastenable to the first base plate 36 (by bolts and nuts, for example), and can further include a substantially cylindrical sleeve 42 extending upwardly in alignment with the substantially cylindrical anchor 38. In this regard, each one of the support frame members 22e, 22f can be inserted through the sleeves 42 of the bases 34 for securing and/or aligning the first frame 16 (and the second frame 18) with respect to the floor 32. Screws 30 can be provided for securing the support frame members 22e, 22f to those sleeves 42 in which the frame members 22e, 22f are positioned. As shown schematically in FIGS. 1 and 2, an anchoring element 43 might be provided to lend additional structural integrity to each substantially cylindrical anchor 34, and such anchoring element 43 can be selected from means known in the art.

It is contemplated that brackets 20 can be provided to secure plant pots 14 to the support frame members 22e, 22f and/or to the bases 34. Furthermore, irrigation equipment, planting equipment, and/or other structures can be positioned within the access area 28 for storage, etc. For example, it is shown schematically that shelves 44 having a pallet-like structure can be provided in the access area 28 proximal the bases 34 for supporting plant pots 14. The shelves 44 can be positioned proximal to and/or secured to the frames 16, 18 (at the bases 34, for example) and extend therebetween. As shown schematically in FIG. 1, for example, plant pots 14 can be provided on the floor 32 outside the access area 28, and it is contemplated that the frame 16 might include one or more stoppers 47 for balancing plant pots 14 that might be supported on the ground 32 by a wheeled structure 46.

The frame 16 can be provided with frame members, which are referenced herein as apex frame members 22g, 22h. Each one of the apex frame members 22g, 22h can include, for example, a horizontal portion 48 and an inclined portion 50 extending therefrom. Each one of the inclined potions 50 of the apex frame members 22g, 22h can have a female end for receiving the inclined frame members 22b, 22c, respectively, and screws 30 can be provided for securing the inclined frame members 22b, 22c to the inclined portions 50. Brackets 20 can be provided with the apex frame members 22g, 22h for securing plant pots 14 proximal thereto.

Further discussion of the brackets 20 shall now be had. The brackets 20 can be provided as any bracket known in the art that is suitable for the present invention. For example, as shown in FIGS. 1-3, where each one of plant pots 14 is provided with an elongated trapezoidal shape, each one of the brackets 20 can be provided with four segments 52a-d, for example, to abut and securingly align a corresponding one of the plant pots 14, and an extension segment 52e for spacing the four segments 52a-d from the corresponding one of the frame members 22a-h.

Continuing with the example of FIGS. 1-3, the extension segment 52e of each one of the brackets 20 is secured to and extends upwardly and/or downwardly from one of the frame members 22a-h corresponding thereto. A first segment 52a extends in a downwardly sloping direction from an end of the extension segment 52e that is opposite the end thereof secured to one of the frame members 22a-h. In a bracket 20 associated with the first frame 16, the first segment 52a slopes in a direction toward the second frame 18 to align a first trapezoidal side, for example, of a corresponding one of the plant pots 14, and, in a bracket 20 associated with the second frame 18, the first segment 52a slopes in a direction toward the first frame 16 to align a second trapezoidal side of the corresponding one of the plant pots 14 opposite the first trapezoidal side thereof, for example. The second segment 52b extends from an end of the first segment 52a opposite the juncture thereof with the extension segment 52e. The second segment 52b extends beneath and securingly seats the corresponding one of the plant pots 14 thereon. In a bracket 20 associated with the first frame 16, the second segment 52b extends toward the second frame 18, and, in a bracket 20 associated with the second frame 18, the second segment 52b extends in a direction toward the first frame 16. A third segment 52c extends from the second segment 52b to securingly align a third trapezoidal side, for example, of the corresponding one of the plant pots 14, and a fourth segment 52d extends from the second segment 52b in a direction opposite the third segment 52c to securingly align a fourth trapezoidal side, for example, of the corresponding one of the plant pots 14. As indicated above, it is contemplated that plant pots having any desired shape are within the scope of the present invention, and, accordingly, any suitable bracket configured for use therewith is contemplated.

The plant pots 14, the brackets 20, and/or the other components of the growing system 10 are dimensioned, positioned, and/or otherwise configured, such that sunlight is allowed to reach preferably all of the plant pots 14. For example, each one of the plant pots 14 associated with brackets 20 of the inclined frame members 22a, 22d is spaced from and at right angles with each adjacent one of the plant pots 14, so as to allow sunlight to reach the plants of such plant pots 14. Those brackets 20 that are positioned along the inclined frame members 22a, 22d support plant pots 14 in a tiered manner that appears as a graded pyramid. Those brackets 20, if any, that are positioned along the inclined frame members 22b, 22c support plant pots in an inverted, tiered manner that appears as an inverted, graded pyramid (not shown). From a top plan view, there can be some overlap between a plant pot 14 (such as a plant pot of those associated with the inclined frame members 22a-d) and an adjacent plant pot 14 (such as those next ones along the inclined frame members 22a-d). Although it is contemplated that the overlap can be up to about twenty-five percent (about 25%), the overlap, if any, is more preferably between about five percent (about 5%) and about ten percent (about 10%).

Each one of the brackets 20 of the inclined frame members 22a-d is preferably evenly-spaced from each adjacent one of the brackets 20 of the inclined frame members 22a-d, though such even-spacing is not required. As another example, regarding those plant pots 14 supported by the frame members 22e, 22f, supported by the apex frame members 22g, 22h, supported by the shelves 44 and/or wheeled structures 46, and/or otherwise positioned within and/or proximal to the access area 28, light is similarly allowed to reach such plant pots 14.

As stated above, it is contemplated that the plant stand can be provided with a single frame, two frames, more than two frames, etc. For example, it is contemplated that two plant stands can share a common frame member, such that the two plant stands collectively include three frame members, each parallel to one another.

Figure 4:
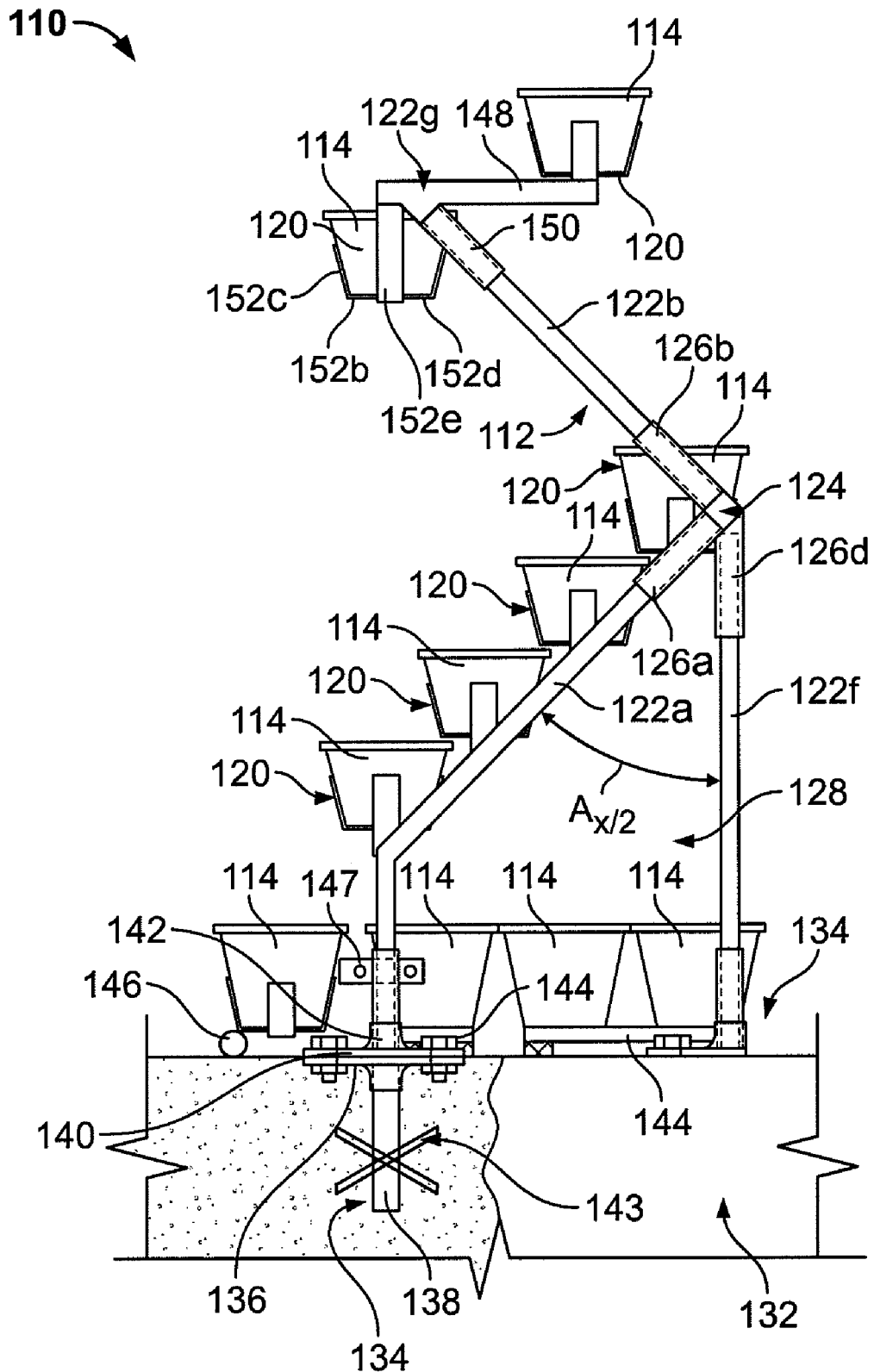
FIG. 4 is an elevational view showing a growing system constructed in accordance with a second exemplary embodiment of the present invention.
Figure 5:
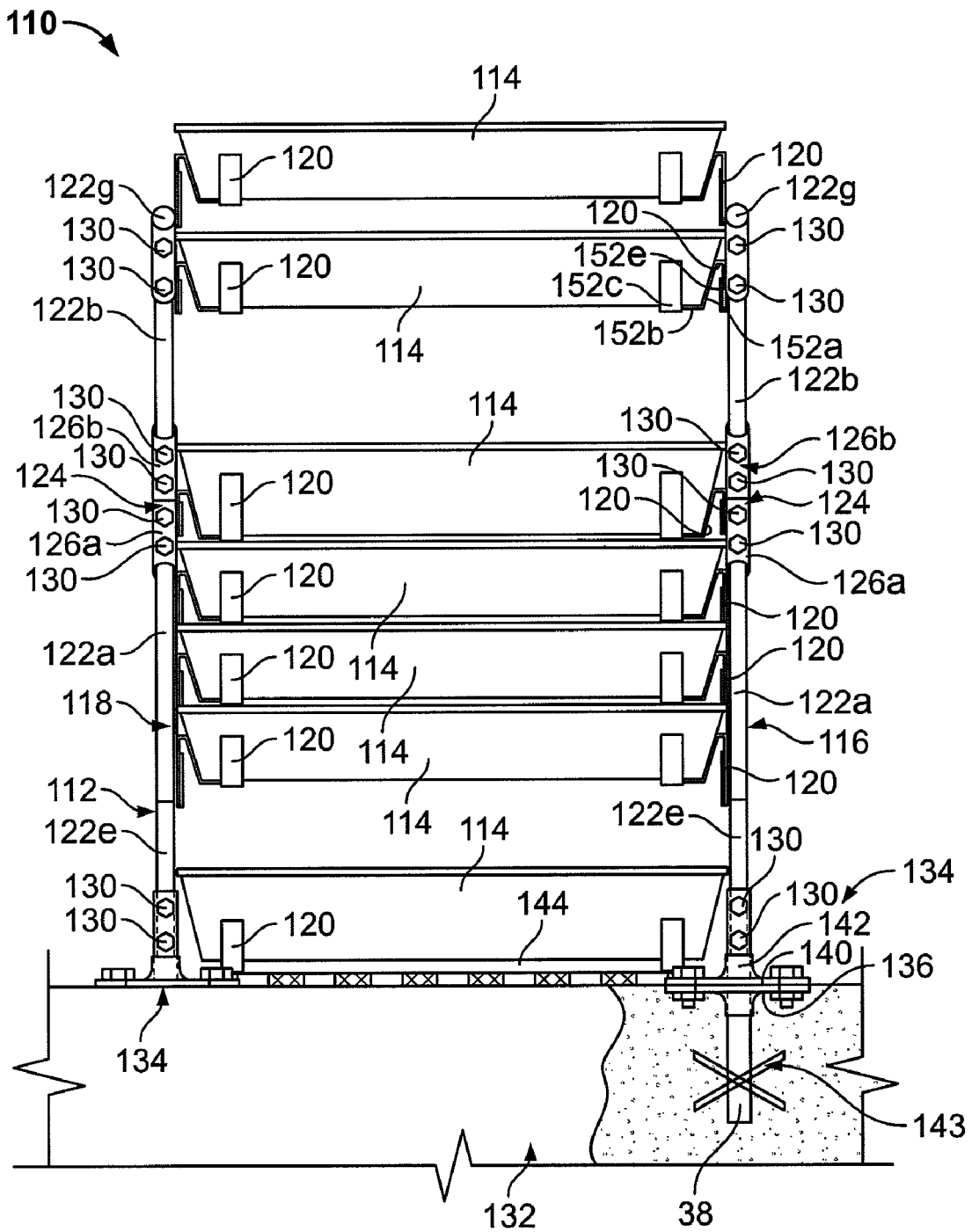
FIG. 5 is a front view showing the growing system of FIG. 4.
Figure 6:
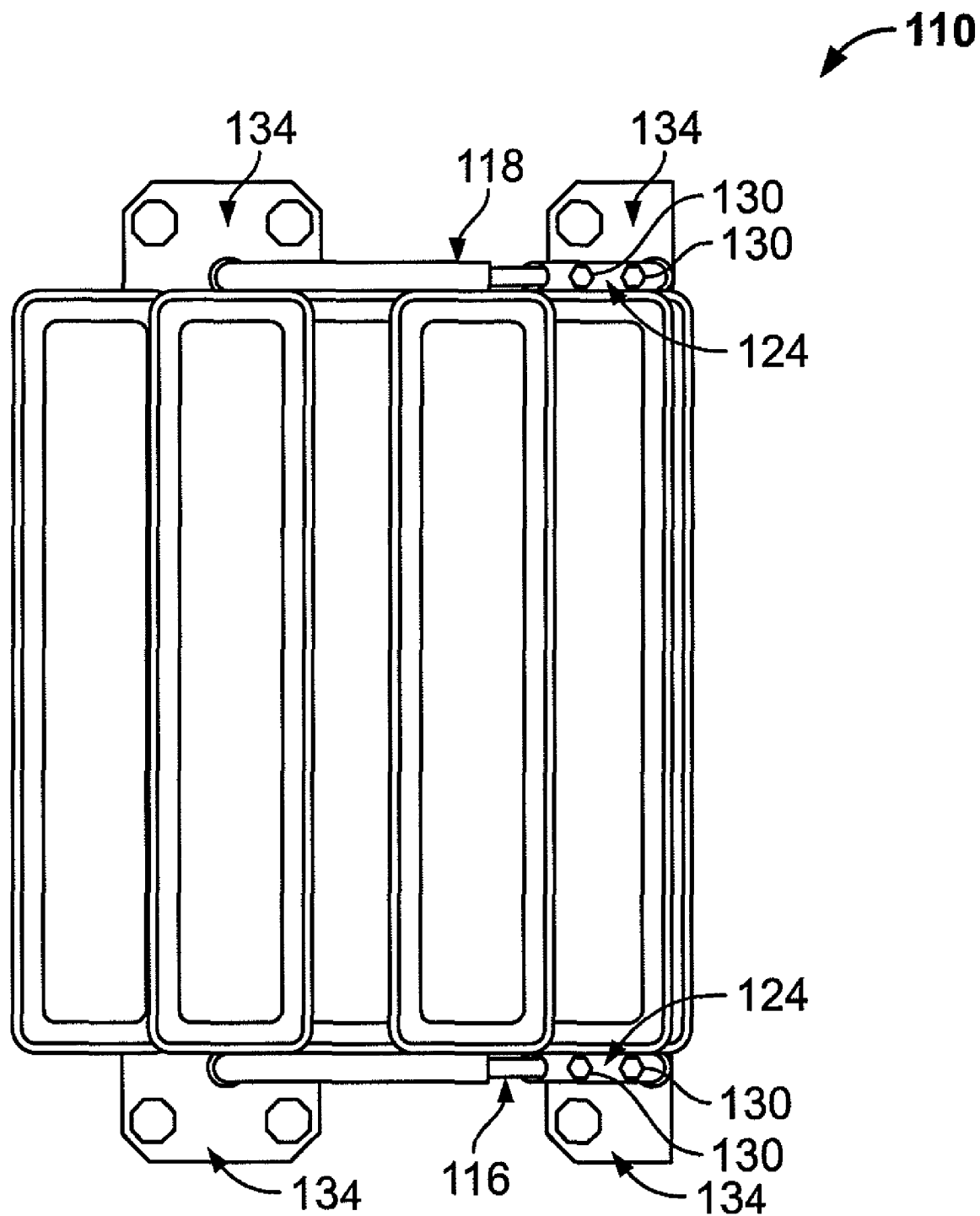
FIG. 6 is a top plan view showing the growing system of FIGS. 4 and 5.

FIGS. 4-6 show a growing system 110 constructed in accordance with a second exemplary embodiment of the present invention. Elements illustrated in FIGS. 4-6 which correspond substantially to the elements described above with reference to FIGS. 1-3 in connection with the growing system 10 have been designated by corresponding reference numerals increased by one hundred. The embodiment of the present invention shown in FIGS. 4-6 can be constructed and used in manners consistent with the foregoing description of the growing system 10 shown in FIGS. 1-3 unless it is stated otherwise.

Referring to FIGS. 4-6, the growing system 110 is shown without the frame members 22c, 22d, and 22h of FIGS. 1-3, and the support frame member 122f of FIGS. 4-6 is shown to extend directly from a corresponding one of the bases 134 to the reinforcing member 124. Similar to the growing system 10 of FIGS. 1-3, the first frame 116 and the second frame 118 of FIGS. 4-6 can be provided to be substantially identical to one another. As shown in FIGS. 4-6, the reinforcing member 124 can be provided with a plurality of female ends, e.g., ends 126a, 126b, and 126d, for receiving the inclined frame members 122a, 122b and the support frame member 122f. As shown, those bases 124 receiving the support frame members 122f can be truncated to save space. Referring to FIG. 4, the frame members 122a, 122b are shown to form a substantially half-X-shaped elevation. For example, the inclined frame member 122a can be provided so as to form angle $A_{x/2}$ that is substantially equal to about forty-five degrees (45°) with respect to the normal and/or with respect to the support frame member 122f. A distance proximal the base from frame member 122e to frame member 122f can be about twenty one and a quarter inches (21¼"), and an outer distance proximal the base from outer plant pot outer surface to outer plant pot outer surface can be about twenty-six and a quarter inches (26¼"), though the present invention is not limited as such, and any suitable dimensions are contemplated.

Figure 7:
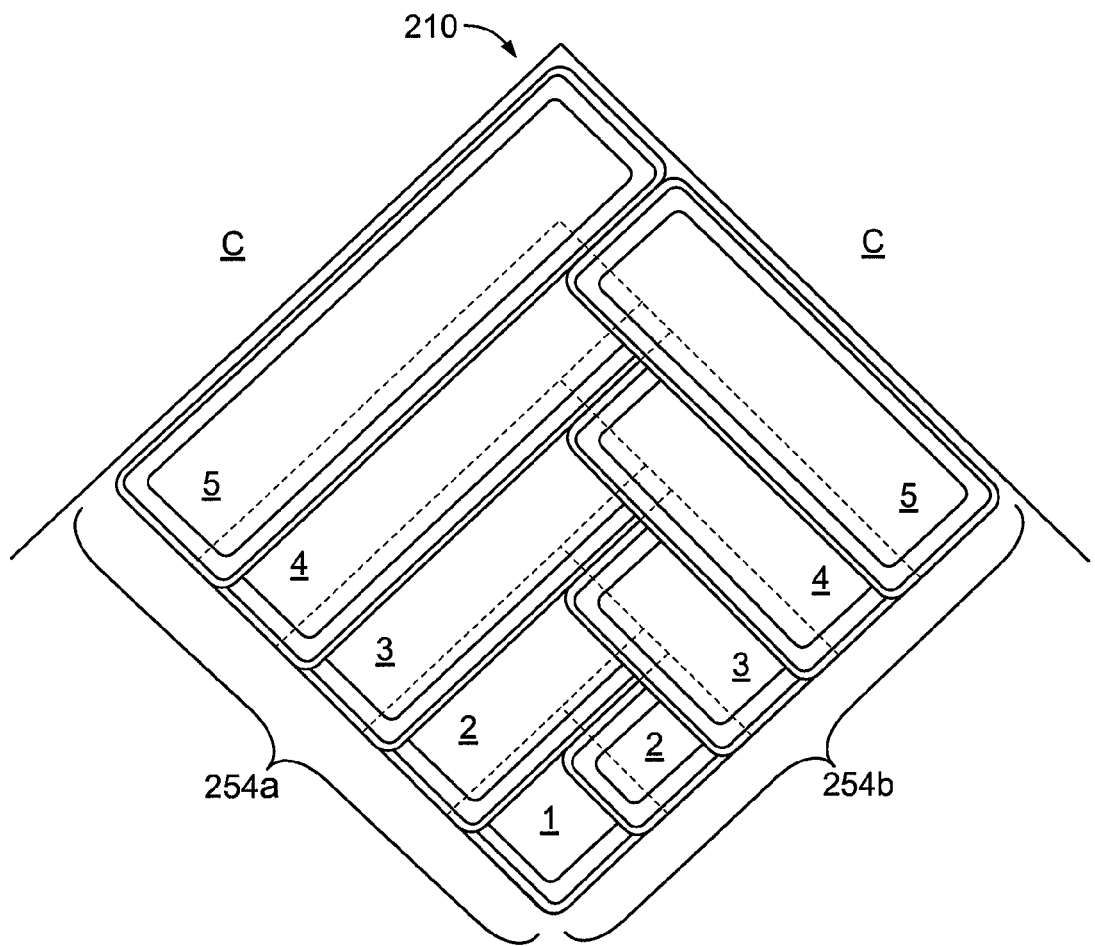
FIG. 7 is a top plan view that schematically shows a growing system constructed in accordance with a third exemplary embodiment of the present invention, the growing system being configured for placement in a corner area of a greenhouse or fenced-in area.

FIG. 7 shows a growing system 210 constructed in accordance with a third exemplary embodiment of the present invention. Elements illustrated in FIG. 7 which correspond substantially to the elements described above with reference to FIGS. 1-3 in connection with the growing system 10 have been designated by corresponding reference numerals increased by two hundred. The embodiment of the present invention shown in FIG. 7 is constructed and used in manners consistent with the foregoing description of the growing system 10 shown in FIGS. 1-3 unless it is stated otherwise.

Referring to FIG. 7, the growing system 210 is shown schematically from a top plan view as being especially configured for placement in the corner C of a nursery room, an outside area that is fenced-in or defined by surrounding trees, etc. As shown, the growing system 210 can include a first set having brackets and corresponding plant pots, a second set having brackets and corresponding plant pots, and one or more frames. The plant pot dimensions of the first and second sets, as well as the relative spacing of the plant pots and brackets along the one or more frames and the position of the frames, are configured such that the first set of plant pots can be interleaved with the second set of plant pots, thereby maximizing plant yield for a given space, e.g., the corner C, while allowing sunlight to reach those plants that might be contained within each one of the plant pots of the first and second sets. Furthermore, it is contemplated that the plant pots extending along a first unobstructed corner side 254a of the growing system 210 can be securingly aligned with brackets along a first frame 116 of a growing system 110 such as that shown in FIG. 5, for example, and that the plant pots extending along a second unobstructed corner side 254b of the growing system 210 can be securingly aligned with brackets along a second frame 118 of a growing system 110 such as that shown in FIG. 5, for example.

Figure 8:
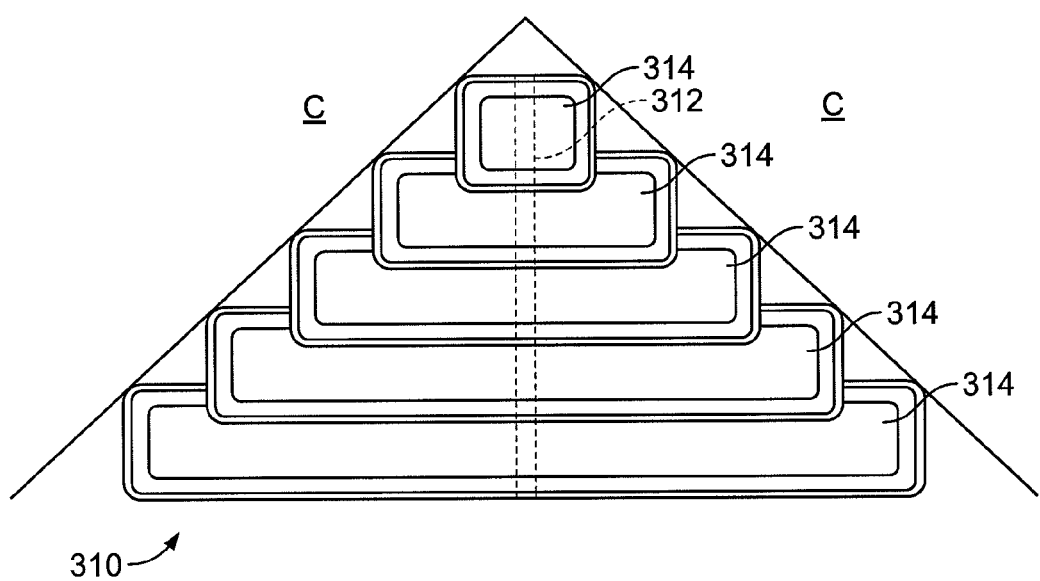
FIG. 8 is a top plan view that schematically shows a growing system constructed in accordance with a fourth exemplary embodiment of the present invention, the growing system being configured for placement in the corner area of the greenhouse or fenced-in area.

FIG. 8 shows a growing system 310 constructed in accordance with a fourth exemplary embodiment of the present invention. Elements illustrated in FIG. 8 which correspond substantially to the elements described above with reference to FIGS. 1-3 in connection with the growing system 10 have been designated by corresponding reference numerals increased by three hundred. The embodiment of the present invention shown in FIG. 8 can be constructed and used in manners consistent with the foregoing description of the growing system 10 shown in FIGS. 1-3 unless it is stated otherwise.

Referring to FIG. 8, the growing system 310 is shown schematically from a top plan view as being especially configured for placement in a corner C of a room or other area of a nursery or greenhouse, for example, or a corner C of an outside area defined by fences, trees, and/or other obstructions. As shown schematically, the growing system 310 includes a single frame 312, for example, and the brackets thereof (not shown) are positioned in such a manner so as to secure each one of the plant pots 314 at a midpoint thereof (and in a graded pyramidal manner as described above). Also, each successive one of the plant pots 314 from a bottom of the frame 312 toward a top of the frame 312 have a successively reduced length to facilitate a "caddy-cornered" position in the corner C. In this regard, the growing system 310 maximizes the use of space available at the corner C location, while allowing sufficient light to reach those plants that might be contained in each one of the plant pots 314.

It is contemplated that the various embodiments of the present invention are suitable for use in a multitude of varying environments. For example, embodiments of the growing system can be used for agriculture in the open fields on soil and inside controlled agriculture warm habitats. As another example, embodiments of the growing system can be used at a nursery for use on cement floors, unfertile soil, and regular soil, e.g., fertile soil. As yet another example, embodiments of the growing system can be used in gardens on lawns without corrupting the grass, on any other form of soil, and on cement and pavement patios and other surfaces.

Embodiments of the present invention, such as that shown in FIGS. 1-3, for example, can be used to enlarge crop capacity in a given unit of land by approximately two to three fold. The dimensions of the growing system 10 and components thereof can vary as desired to accommodate various heights, widths, and depths, and the dimensioning of the brackets 20 can include at least one bracket of a first dimensioning and at least one bracket of another dimensioning to accommodate plant pots having disparate dimensioning.

Preferred embodiments of the growing system provide an efficient means for increasing the amount of planting space available in typical yard areas, gardens, patios, apartment balconies, etc. Larger units can provide solutions for greenhouses and nurseries allowing them to multiply production and increase revenues. Preferred embodiments of the growing system can be assembled easily and are preferably formed of sturdy, reliable, and weatherproof structures suitable for any desired terrain. Embodiments of the growing system are preferably configured to be compact and lightweight, so as to fit into standard vehicles for easy transport.

The adjustment of unit sizes and yield capacities provide a desirable fit for almost any given area, offering a practical solution for an enhanced yield within an otherwise restricted space. In preferred embodiments, the growing systems can be made of lightweight fitted galvanized pipes that fit into place and are secured by butterfly bolts for easy assembly. The growing systems are preferably configured to include plant pots or sills having a height of about five inches (5") to about six and a half inches (6½"), though any suitable height is contemplated, and the plant pots can be engineered to endure the accumulating weight the plant pots or sills entail when filled. Preferred embodiments of the growing systems allow for easy access and sunlight, providing for optimal growing conditions within a limited space. In some embodiments, telescopic expansions can be provided for even greater sunlight exposure.

In preferred embodiments of the invention, a practical and economical way is provided to increase growing capacity for areas in which space is otherwise limited or in areas where the terrain might be unsuitable such as concrete, asphalt, tiles and natural rock. With respect to the embodiment of FIGS. 1-3, it is contemplated that yield can be enhanced by, for example, about two-hundred forty-three percent (about 243%) to about two-hundred eighty-six percent (about 286%) with respect to conventional methods in the same given unit of land. With respect to the embodiment of FIGS. 4-6, it is contemplated that yield can be enhanced by, for example, about three-hundred percent (about 300%) to about three-hundred sixty-seven percent (367%) with respect to conventional methods in the same given unit of land.

It is preferred that the growing system offer improvement in the handling and care of the plants as well as in the quality of the work environment. As the costs involved in producing this capacity of yield drops, it is also contemplated that access to planting areas may be more physically comfortable for the planter. In preferred embodiments, benefits are contemplated for the following persons, though it shall be understood that the invention is not limited by the type of person:

Owners of small yards, gardens or patios who want to grow a significant amount of plants, flowers, fruits or vegetables but have previously been limited by space restrictions;

Consumers interested in organic lifestyles, an ever growing market share, who now have the option and the ability to grow their own fruits and vegetables in a significant amount to suffice their needs;

Greenhouse owners/keepers seeking to increase their yields and revenues by significantly increasing their growing capacity;

Large scale hydroponic cultivation capabilities for commercial and academic purposes;

Nurseries looking for smart, efficient and economical solutions which will provide them with the ability to capitalize on sprouting seedlings twice each season: (a) by the use of plastic trays placed atop the plant pots or sills for the initial sprout; and/or (b) the second time after planting the seedlings in the plant pots or sills themselves after removing the plastic trays; and/or Farmers, hobbyists and other agriculture buffs interested in economizing their work and/or increasing their revenues which in turn will possibly lower the prices of products and produce offered due to: (a) the need for less workers to tend to the plants as they are grown in a smaller area; and/or (b) use of hydration, irrigation and fertilizers in the planting environment.

Additional contemplated benefits include the following, though it shall be understood that the invention is not limited as such: (1) minimizing bent and/or uncomfortable positions to prevent joint and back pain; (2) use of the growing system as an automated irrigation system, drip system, or a manually or otherwise operated watering system; and/or (3) increasing productivity levels as a result of convenient and comfortable work effort.

It will be understood that the embodiments of the present invention described herein are merely exemplary and that a person skilled in the art may make many variations and modifications without departing from the spirit and the scope of the invention. All such variations and modifications, including those discussed above, are intended to be included within the scope of the invention as defined by the appended claims.

What is claimed is:

1. A growing system for enhanced yield, comprising a plant stand and a plurality of plant pots, said plant stand including at least one frame and a plurality of brackets securing said plurality of plant pots to said at least one frame in a static tiered formation configured to allow an unobstructed from above top portion of each of said plurality of plant pots to receive light.

2. The growing system of claim 1, wherein each one of said plurality of plant pots overlaps a portion each adjacent one of said plurality of plant pots lower thereto.

3. The growing system of claim 1, wherein said at least one frame has a substantially x-shaped elevation.

4. The growing system of claim 1, wherein said at least one frame has a substantially half x-shaped elevation.

5. The growing system of claim 1, wherein said at least one frame is configured to, in use, cooperate with a surface upon which said plant stand is supported to define an access area.

6. The growing system of claim 1, wherein said at least one frame includes a first frame.

7. The growing system of claim 6, wherein said first frame includes a reinforcing member and a plurality of frame members extending therefrom, and wherein said reinforcing member and said plurality of frame members have a substantially x-shaped elevation.

8. The growing system of claim 6, wherein said at least one frame includes a second frame opposite said first frame.

9. The growing system of claim 8, wherein said plurality of plant pots each have a first end secured proximal said first frame and a second end secured proximal said second frame.

10. The growing system of claim 9, wherein a first subset of said plurality of brackets secure said first end proximal said first frame, and wherein a second subset of said plurality of brackets secure said second end proximal said second frame.

11. The growing system of claim 10, wherein each one of said plurality of plant pots has, positioned between said first end and said second end, a bottom surface and a plurality of opposing side surfaces.

12. The growing system of claim 11, wherein each one of said plurality of brackets includes a segment configured to seat said bottom surface.

13. The growing system of claim 11, wherein each one of said plurality of brackets includes at least one segment securing at least one of said opposing side surfaces.

14. A growing system for enhanced yield, comprising a plant stand and a plurality of plant pots, said plant stand including a first frame, a second frame spaced apart from said first frame, and a plurality of brackets securing in a static arrangement said plurality of plant pots to said first frame and said second frame, wherein each one of said plurality of plant pots overlaps a portion of each adjacent one of said plurality of plant pots lower thereto.

15. The growing system of claim 14, wherein each of said plurality of plant pots includes a bottom surface, a first end, a second end, and a plurality of opposing side surfaces, and wherein each of said plurality of brackets includes a first segment configured to seat said bottom surface and a plurality of segments securing said opposing side surfaces.

16. The growing system of claim 14, wherein said first and second frames have a substantially x-shaped elevation.

17. The growing system of claim 14, wherein said first and second frames have a substantially half x-shaped elevation.

18. The growing system of claim 14, wherein said first and second frames are configured to, in use, cooperate with a surface upon which said plant stand is supported to define an access area.

19. A growing system for enhanced yield, the growing system comprising:
one or more frames adapted to support a static tiered arrangement of plant pots,
a first plant pot on a first tier of the tiered arrangement, and
a second plant pot on a second tier of the tiered arrangement,
wherein the first plant pot overhangs the second plant pot obstructing from above a first portion thereof, and
wherein at least a second portion of the second plant pot is unobstructed from above.

20. The growing system of claim 19 further comprising a third plant, wherein the first plant pot also overhangs the third plant pot obstructing from above at least a first portion thereof, and wherein at least a second portion of the third plant pot is unobstructed from above.

21. The growing system of claim 20, wherein the second and third plant pots are substantially adjacent one anther in the tiered arrangement.

22. The growing system of claim 20, wherein the second and third plant pots are on a same tier of the tiered arrangement.

23. The growing system of claim 20, wherein the second and third plant pots are on different tiers of the tiered arrangement.

24. The growing system of claim 19, wherein the first plant pot is adapted to receive more direct light from above than the second plant pot.

25. The growing system of claim 24 further comprising a third plant, wherein at least one of the first and second plant pots overhangs a third plant pot obstructing from above a first portion thereof, and wherein the second plant pot is adapted to receive more direct light from above than the third plant pot.

26. The growing system of claim 19, wherein the first plant pot is adapted to receive more rain from above than the second plant pot.

27. The growing system of claim 26, further comprising a third plant wherein at least one of the first and second plant pots overhangs a third plant pot obstructing from above a first portion thereof, and wherein the second plant pot is adapted to receive more rain from above than the third plant pot.

28. The growing system of claim 19 further comprising a third plant pot, wherein at least one of the first and second plant pots overhangs the third plant pot obstructing from above at least a first portion thereof, and wherein the first portion of the third plant pot is greater than the first portion of the second plant pot.

29. The growing system of claim 28, wherein at least one of the first and second plant pots completely obstructs from above the third plant pot.

30. The growing system of claim 19, wherein the first portion of the second plant pot is a frame portion of the second plant pot.

31. The growing system of claim 19, wherein the first portion of the second plant pot is a portion of a growing surface of the second plant pot.

32. The growing system of claim 31, wherein the portion of the growing surface is approximately half of the growing surface.

33. The growing system of claim 19, wherein the plant pots in the tiered arrangement are arranged along (i) a substantially x-shaped elevation or (ii) a substantially half x-shaped elevation, as defined by the one or more frames.

34. The growing system of claim 19, wherein the one or more frames include a lower portion and an upper extending over the lower portion, wherein the first plant pot is supported by the upper portion and the second plant pot is supported by the lower portion.

35. The growing system of claim 19, wherein the one or more frames are adapted to convey water through one or more frame members for irrigating one or more of the plant pots.

* * * * *